United States Patent [19]

Gradei et al.

[11] Patent Number: 5,190,257
[45] Date of Patent: Mar. 2, 1993

[54] BEVERAGE CONTAINER HOLDER

[75] Inventors: Alan Gradei, Mt. Prospect; John Allen, Palatine, both of Ill.

[73] Assignee: Alan & Alan Inc., Mt. Prospect, Ill.

[21] Appl. No.: 772,226

[22] Filed: Oct. 7, 1991

[51] Int. Cl.⁵ ............................................. F16M 13/00
[52] U.S. Cl. ................................. 248/231.7; 248/311.2
[58] Field of Search ............... 248/311.2, 231.7, 689, 248/314, 313, 291, 316.1; 224/42.45 R

[56] References Cited

U.S. PATENT DOCUMENTS

| D. 236,175 | 8/1975 | Wintz | D6/93 |
|---|---|---|---|
| 1,385,841 | 7/1921 | Melish . | |
| 1,744,103 | 1/1930 | Burrows . | |
| 2,685,992 | 8/1954 | Cornell | 224/45 |
| 2,911,016 | 11/1959 | Kenney | 141/328 |
| 3,021,106 | 2/1962 | Kramer | 248/231.7 |
| 3,051,428 | 8/1962 | Schult | 248/226 |
| 3,184,201 | 5/1965 | Smith | 248/311.2 |
| 3,317,171 | 5/1967 | Kramer | 248/311.2 X |
| 3,734,439 | 5/1973 | Wintz | 248/311.2 X |
| 3,902,931 | 9/1975 | Danciger et al. | 248/231.7 X |
| 4,819,843 | 4/1989 | Nakayama | 224/42 |
| 4,828,210 | 5/1989 | Anderson et al. | 248/231.7 X |
| 4,844,399 | 7/1989 | Harm | 248/311.2 |
| 5,007,612 | 4/1991 | Manfre | 248/231.7 X |

*Primary Examiner*—David L. Talbott

[57] ABSTRACT

A holder for carrying beverage containers and the like includes a bracket for releasably mounting the holder on a support and having a generally C-shaped clamp bracket portion and a generally U-shaped swing bracket portion depending from the clamp bracket portion, an adjustable clamping screw associated with the clamp bracket portion, a carrier for the container, and means for pivotally mounting the carrier to the swing bracket portion so that carrier may swing freely below the support. The clamp bracket portion permits the support to be inserted or removed from the clamp opening and defines a tapered support receiving area opposite the clamping screw so that the screw can releasably secure the support in the receiving area. The swing bracket portion includes a pair of spaced, downwardly extending arms between which the carrier is pivotally mounted.

2 Claims, 1 Drawing Sheet

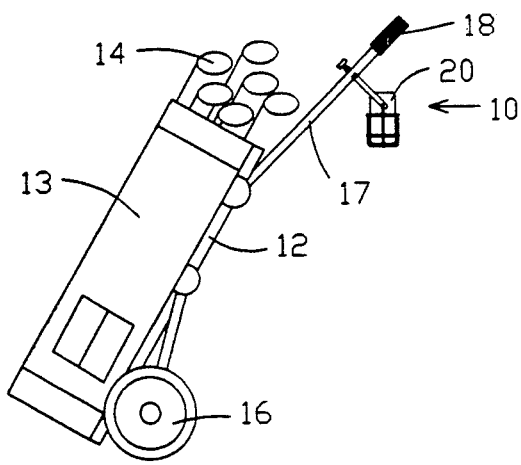
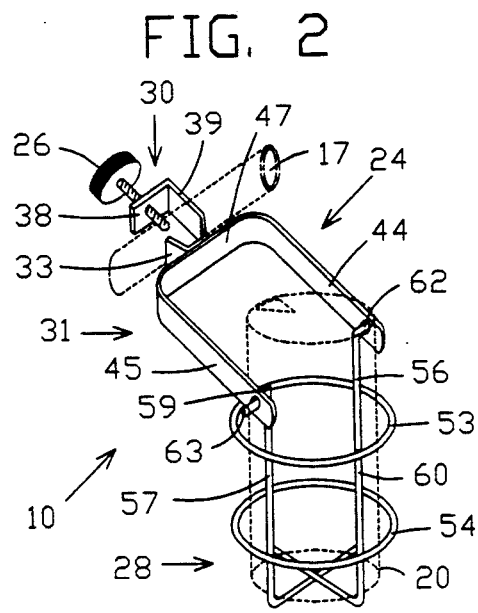
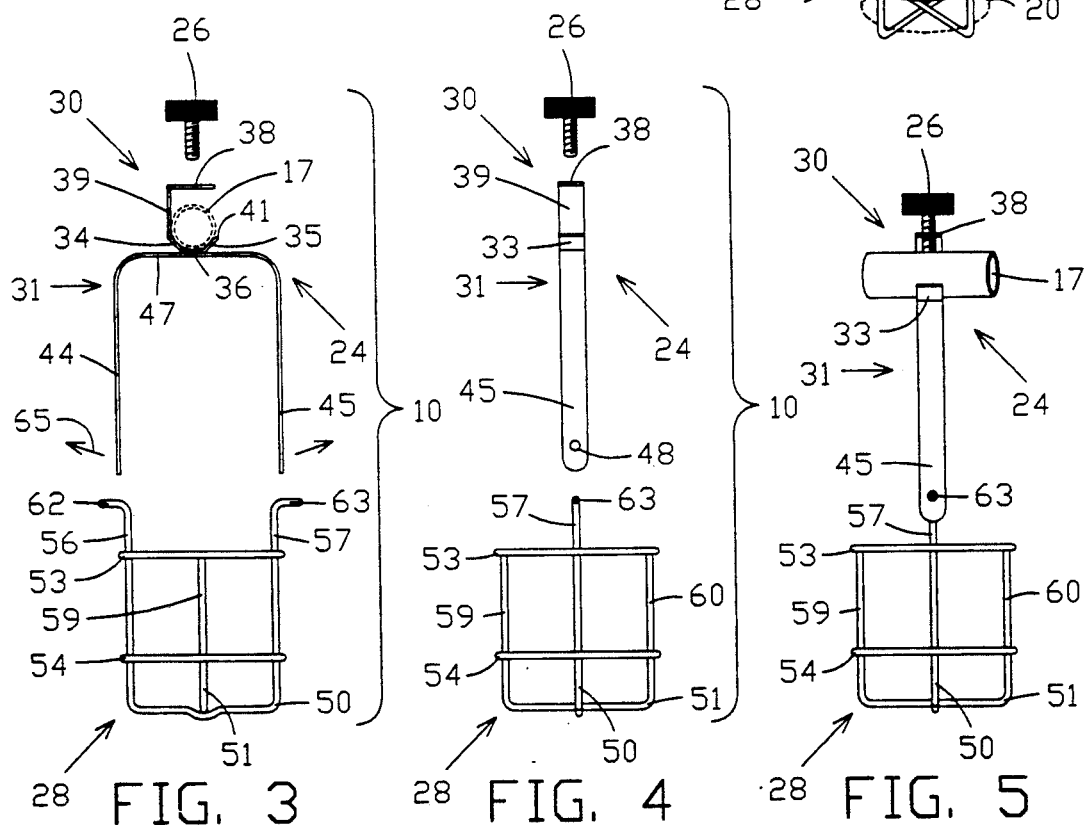

BEVERAGE CONTAINER HOLDER

BACKGROUND OF THE INVENTION

1. Technical Field

This invention relates generally to a container holder and, more particularly, to a removable holder having a swinging carrier for holding a container.

2. Background Art

In the prior art, a number of holders have been made available for supporting a beverage container when a person drinking from the container puts the container down to perform another activity. In an application where the holder is secured to a moving object such as an automobile, a boat, a golf cart or the like, the holder should include a container carrier that adjusts to the movement of the vehicle so that the beverage container is maintained in a generally upright orientation and liquid is not spilled from the container as the vehicle encounters bumps or turns, is lifted, bounced or otherwise jostled. Holders providing a container carrier which maintain the beverage in a level position often include a carrier adapted to hold a beverage container pivotally connected to a mounting which, in turn, is secured to a support on the vehicle. Typically, such container holders are either too expensive, overly complicated or have more parts than necessary to perform their intended function.

SUMMARY OF THE INVENTION

The present invention is directed to overcoming one or more of the problems as set forth above.

It is a general object of the present invention to provide a new and improved beverage holder which is simple, compact, inexpensive and functional.

According to the present invention, a holder for carrying beverage containers and the like includes a bracket for releasably mounting the holder on a support and having a generally C-shaped clamp bracket portion and a generally U-shaped swing bracket portion depending from the clamp bracket portion, an adjustable clamping screw associated with the clamp bracket portion, a carrier for the container, and means for pivotally mounting the carrier to the swing bracket portion so that carrier may swing freely below the support.

In an exemplary embodiment of the invention, the clamp bracket includes at the upper end a finger for carrying the clamping screw and at the lower end a tapered anvil formed between two slanted side walls so that as the screw is extended downward into the clamp bracket it will engage a support positioned within the clamp opening and wedge it against the anvil to thereby fix the holder to the support.

A feature of the invention is that the clamp bracket defines a gap through which the support may be inserted or removed so that once the clamping screw releases the support, the bracket may be separated from the support without further disassembly of the holder. The screw is always at least partially threaded on the bracket so that it is not inadvertently misplaced.

It is a further feature of the invention that the holder be constructed from a minimum of number of simple parts which are easily formed from common material. The clamp bracket and the swing bracket may be constructed from separate elements and fixed together, while the clamping screw is a common thumbscrew or a simple screw with a knurled head that may be manually turned.

It is another feature of the invention to permit the mounting bracket and the carrier to be manually disassembled as necessary for compact storage.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a side elevational view of a golf cart having a beverage holder constructed in accordance with the present invention attached to the handle;

FIG. 2 is a perspective view of the beverage holder with a beverage container shown in phantom;

FIG. 3 is an exploded, front elevational view of the beverage holder;

FIG. 4 is an exploded, side elevational view of the beverage holder; and,

FIG. 5 is a side elevational view of the assembled beverage holder mounted on a tube.

DESCRIPTION OF THE PREFERRED EMBODIMENTS

Best Modes for Carrying Out the Invention

A typical use for a beverage holder constructed in accordance with the present invention is shown in FIG. 1. The beverage holder, generally designated 10, is mounted on a pull cart 12 carrying a golf bag 13 with golf clubs, collectively designated 14. The golf pull cart 12 has a pair of spaced wheels 16 and includes a tubular handle 17 with a hand grip 18. As is well known, when the cart 12 is to be moved, the cart handle 12 is pushed down to pivot the bag 13 about the wheels 16 and lift it off the ground so that the bag 13 can be easily pulled around a course by a golfer (not shown).

As will be seen hereinafter, the beverage holder 10 is mounted on the handle 17 so that a beverage container, such as can 20, can swing freely below. The can 20 will rotate and remain in a vertical orientation even though the supporting handle 17 is moved up and down as the cart 12 is moved. It will be appreciated that the holder can be used in applications other than a golf cart, where it is desirable to support a beverage container upright.

The beverage holder includes a mounting bracket, generally designated 24, a clamping screw 26 and a wire frame container carrier, generally designated 28. The mounting bracket 24 may be formed from aluminum strips 1/16 inch thick by ½ inch wide and has a C-shaped clamp bracket portion, generally designated 30, and a U-shaped swing bracket portion, generally designated 31. The clamp and swing brackets 30 and 31 may be formed from separate elements and fixed together by suitable means.

The clamp bracket 30 includes a bottom wall 33 having inwardly slanted side segments 34 and 35 on each side of a flat center segment 36, a flat top wall 38, and a side wall 39 extending between the top of the slanted segment 34 and one end of the top wall 38. The bottom wall segments 34, 35 and 36 of the C-shaped clamp bracket 30 generally define a tube receiving portion and the top wall 38 of the C-shaped clamp bracket defines a finger for carrying the clamping screw 26. The slanted segment 35 and the free end of the top wall 38 define a side opening, or gap 41, through which the support tube 17 may be moved. The gap 41 is of sufficient size to permit the handle tube 17 to be laterally inserted into or removed from the clamp bracket open center. The tapered segments 34 and 35 narrow to the center segment 36 to define a tapered anvil for receiving the handle tube 17. The clamp bracket 30 is oriented so that the tube 17 passes through the open center of the clamp bracket 30 on a fixed mount axis spaced from but generally perpendicular to the carrier swing axis.

The knurled thumbscrew 26 extends through a threaded bore (not numbered) defined in the center of the top wall 38 which is located directly above the bottom wall flat segment 36. By manually turning the knurled head, the thumbscrew 26 can be threaded downwardly into the center of clamp bracket 30 towards the bottom wall 33. In this manner, the free end of the screw 26 is moved to engage the exterior of the handle tube 17 and fixedly wedge the handle tube 17 between the screw end and the clamp bracket bottom wall 33 to clamp the holder 10 on the handle tube 17.

The swing bracket 31 has a pair of spaced side arms 44 and 45 joined at their upper ends by a connecting bight portion, or center section 47. The upper surface of the center section 47 is secured to the lower surface of the clamp bracket bottom flat wall segment 36 so that the swing bracket 31 depends downwardly therefrom. Spaced from the free ends of each of the downwardly extending side arms 44 and 45 are tab-receiving apertures 48.

The container carrier 28 may be formed from vinyl coated wire and has a large U-shaped support wire 50, a small U-shaped support wire 51, and upper and lower annular wire rings 53 and 54 arranged to form a basket with a generally cylindrical top opening adapted to receive a container such as the can 20. As shown in FIG. 2, the can 20 is placed downwardly into the carrier through a top opening broadly defined by the upper ring 53. The U-shaped support wires 50 and 51 are positioned in planes which are at right angles to each other and may be fixed to one another, as by welding, soldering or the like, at the bottom of the carrier.

The upper and lower wire rings 53 and 54 are vertically spaced and extend around the U-shaped support wires 50 and 51 and may be fixed to each of the U-shaped support wires 50 and 51 by welding, soldering or other means. The large U-shaped support wire 50 has upright arms 56 and 57 which are positioned at diametrically opposed sides of the carrier and extend upwardly past the upper wire ring 53. The small U-shaped support wire 51 has upright arms 59 and 60 which terminate adjacent the upper wire ring 53. The upright arms 56 and 57 of the large wire 50 define a pair of diametrically opposed lugs, or tabs 62 and 63, respectively, that extend radially outward from the central axis of the carrier 28. The container carrier may also be constructed in forms other than as a wire frame.

The tabs 62 and 63 of the carrier 28 may be moved into operative position within the swing bracket apertures 48 by manually flexing the side arms 44 and 45 outward as shown by the arrows 65 in FIG. 3 to allow insertion of the carrier 28 between the arms 44 and 45 and then allowing the arms 44 and 45 to return to their normal position. As a result, the carrier 28 may swing freely within the swing bracket 31 below the handle tube 17 about a generally horizontal swing axis defined by a line extending between the side arm apertures 48. It should be apparent that the tabs and apertures may be reversed with the swing arms carrying the tabs and the wire frame defining tab-receiving apertures.

As can be seen by referring to the drawings, the holder 10 can be easily removed from the supporting handle 17 by turning the thumbscrew 26 to release the clamping action and moving the handle 17 through the gap 41 in the clamp bracket 30. The holder 10 can then be further disassembled for compact storage by removing the carrier 28 from the swing bracket 31 by disengaging the tabs 62 and 63 from the respective apertures 48.

To illustrate one specific method of constructing the holder 10, typical sizes for the various components follow. The bracket clamp portion 30 has an internal height of approximately 1-¼ inches high and an internal width of approximately ⅞ inch and a gap opening of ⅞ inch. The bracket clamp portion 30 can accommodate supporting tubes having diameters roughly ranging from ½ to ⅞ inch. The bracket swing portion 31 is approximately 3-⅛ inches wide and 4-¼ inches high with the arm apertures ½ inch from the bottom. The carrier wires are ⅛ inch thick and the carrier 28 has an internal diameter of 2-¾ inches and a height of 3 inches to the upper ring and 4 inches to the tabs.

Industrial Applicability

From the foregoing, it should be apparent the beverage container holder described herein is simple, compact and inexpensive, yet provides a convenient and reliable means for holding a beverage in an upright orientation on a moving support.

Other aspects, objects and advantages of this invention can be obtained from a study of the drawings, the disclosure and the appended claims.

What is claimed is:

1. A holder adapted to be mounted on a support and carry a container comprising:

a mounting bracket including a generally C-shaped clamp portion and a separate generally U-shaped swing portion attached to said clamp portion;

said clamp portion defining an open center adapted to receive a support and having a support receiving portion at one end and a threaded bore defined in the opposing end, said clamp portion defining a gap between said one end and said opposing end of sufficient size permitting the support to be inserted therethrough into said open center, said receiving portion including a flat center segment and a pair of slanted side segments narrowing to said center segment to define a tapered anvil for receiving the support;

a screw extending through said bore and adapted to be adjustably moved toward said receiving portion to clamp onto the support positioned within said open center between said receiving portion and said screw;

said swing portion having a flat center section joining a pair of spaced downwardly extending arms, the lower outer surface of the clamp portion center segment being fixed to the outer surface of the swing portion center section;

a carrier including means for carrying a container therein; and, cooperating means associated with said swing portion and said carrier for pivotally mounting said carrier on said swing portion so that said carrier swings under the support.

2. A holder adapted to be mounted on a support and carry beverage containers and the like comprising:
- a container carrier having a pair of extending tabs at the upper end thereof;
- a mounting bracket including a first portion for securing said bracket to a support and a separate second portion attached to and depending from said first portion for mounting said carrier;
- said first portion having a support receiving portion at one end, a finger portion at the other end opposed to said support receiving portion, and an open center at least partially surrounding the support placed within said open center between said receiving and finger portions, said first portion being generally C-shaped with the lower C-segment defining said support receiving portion and the upper C-segment defining said finger portion, said receiving portion including a flat center segment and a pair of slanted side segments narrowing to said center segment to define a tapered anvil for receiving the support, said receiving and finger portions defining a gap therebetween permitting the support to be inserted therethrough into said open center of said first portion;
- said second portion having a pair of spaced arms extending downwardly away from the support, said second portion being generally U-shaped and having a flat center portion joining said arms and substantially perpendicular to the support, the free ends of each arm defining an aperture on a swing axis adapted to receive the carrier tabs for pivotally mounting the carrier within said second portion, said swing axis being spaced below and substantially perpendicular to the support;
- means for fixing the lower outer surface of the first portion center segment to the upper outer surface of the second portion center section; and,
- a screw extending through a cooperating threaded bore defined in said finger portion and adapted to be manually moved toward said receiving portion to clamp the support between said receiving portion and said screw to thereby releasably secure the holder to the support, whereby the carrier swings on an axis spaced from and substantially perpendicular to the support.

* * * * *